(12) United States Patent
Higashide et al.

(10) Patent No.: US 11,354,654 B2
(45) Date of Patent: Jun. 7, 2022

(54) ELECTRONIC MONEY MANAGEMENT SYSTEM AND ELECTRONIC MONEY MANAGEMENT METHOD

(71) Applicant: NTT Communications Corporation, Chiyoda-ku (JP)

(72) Inventors: Haruhisa Higashide, Tokyo (JP); Yasuhide Katou, Tokyo (JP); Mitsuya Tomoda, Kashiwa (JP); Kentaro Numa, Tokyo (JP)

(73) Assignee: NTT Communications Corporation, Chiyoda-ku (JP)

( * ) Notice: Subject to any disclaimer, the term of this patent is extended or adjusted under 35 U.S.C. 154(b) by 0 days.

(21) Appl. No.: 16/991,830

(22) Filed: Aug. 12, 2020

(65) Prior Publication Data
US 2021/0133731 A1   May 6, 2021

(30) Foreign Application Priority Data
Nov. 1, 2019  (JP) .............................. JP2019-200275

(51) Int. Cl.
*G06Q 20/38* (2012.01)
*G06Q 20/36* (2012.01)
(52) U.S. Cl.
CPC ........... *G06Q 20/381* (2013.01); *G06Q 20/36* (2013.01)
(58) Field of Classification Search
CPC .. G06Q 20/381; G06Q 20/36; G06Q 20/3672; G06Q 40/04; G06Q 20/065
See application file for complete search history.

(56) References Cited

U.S. PATENT DOCUMENTS 7,819,307 B2   10/2010  Lyons et al.
2003/0105714 A1  6/2003  Alarcon-Luther et al.
(Continued)

FOREIGN PATENT DOCUMENTS

CN   101014985 A   8/2007
CN   102282583 A   12/2011
(Continued)

OTHER PUBLICATIONS

King, Michael Robert and Osler, Carol L. and Rime, Dagfinn, Foreign Exchange Market Structure, Players and Evolution (Aug. 14, 2011). Norges Bank Working Paper No. Oct. 2011. (Year: 2011).*

(Continued)

*Primary Examiner* — Virpi H Kanervo
(74) *Attorney, Agent, or Firm* — Oblon, McClelland, Maier & Neustadt, L.L.P.

(57) ABSTRACT

According to one embodiments, an electronic money management system includes a fund charging controller and a deduction unit. The controller performs a control in a manner such that, if a transaction is made on a user's terminal through an electronic money service of a first country to charge a designated amount of funds in a currency of a second country the designated amount of funds in the currency of the second country is charged based on an exchange rate at time of the transaction. The currency of the second country differs from a currency of the first country. The deduction unit, if an electronic money service of the second country is used on the terminal, deduct an amount used from the currency of the second country charged by the controller.

7 Claims, 10 Drawing Sheets

(56) References Cited

U.S. PATENT DOCUMENTS

| | | | |
|---|---|---|---|
| 2007/0095892 A1 | | 5/2007 | Lyons et al. |
| 2010/0036741 A1* | | 2/2010 | Cleven ................... G06Q 20/40 |
| | | | 705/17 |
| 2012/0036063 A1* | | 2/2012 | Sivapathasundram ...................... |
| | | | G06Q 20/10 |
| | | | 705/39 |
| 2013/0018738 A1* | | 1/2013 | Faires ................... G06Q 20/36 |
| | | | 705/16 |
| 2013/0085927 A1 | | 4/2013 | Scott |
| 2016/0132965 A1* | | 5/2016 | Malhotra ............... G06Q 40/04 |
| | | | 705/37 |
| 2017/0323293 A1 | | 11/2017 | Strauss |
| 2017/0337548 A1 | | 11/2017 | Griggs et al. |
| 2017/0364999 A1* | | 12/2017 | Herriger .............. G06Q 20/381 |
| 2018/0053173 A1* | | 2/2018 | Ballout .................. G06Q 20/04 |
| 2019/0333042 A1 | | 10/2019 | Kim |

FOREIGN PATENT DOCUMENTS

| | | | |
|---|---|---|---|
| CN | 102496107 A | | 6/2012 |
| CN | 105389903 A | | 3/2016 |
| CN | 106803176 A | | 6/2017 |
| CN | 107093065 A | | 8/2017 |
| JP | 11-066208 | | 3/1999 |
| JP | 2004/240858 | | 8/2004 |
| JP | 2006-318229 | | 11/2006 |
| JP | 2009/129412 | | 6/2009 |
| JP | 2013/114495 | | 6/2013 |
| KR | 10-2014-0128293 A | | 11/2014 |
| KR | 20170041094 A | * | 4/2017 |
| TW | 201801008 A | | 1/2018 |

OTHER PUBLICATIONS

Office Action dated Sep. 10, 2020 in corresponding Korean Patent Application No. 10-2020-0104329 (with English Translation), citing documents AO and AV-AX therein, 14 pages.

"How to transfer foreign currency account", Source: Yun Writer Blog, https://blog.naver.com/8206082/221366130315, Sep. 27, 2018, 8 pages.

"Debit cards that can be settled in both foreign currency and won currency are on the market", Source: ED AIL Y, https://news.naver.com/main/read.nhn?mode=LSD&mid=sec&sidl=101&oid=018&aid=0 003642680, Oct. 4, 2016, 2 pages.

"Write about re-exchange guarantee", Source: https:// catchapp4.rssing.com/ chan-5194948/ all_p2840.html (Record url of archive. is: https://archive.is/wJYud) "Flying Bank—Part related to Merchant", Feb. 22, 2019, 13 pages.

Office Action dated Mar. 15, 2021 in Korean Application No. 10-2020-0104329 (w/English translation).

"Easy to start mobile payment" . . . 'Kakao Pay' launched Article; https://news.naver.com/main/read .nhn?mode=LSD&mid=sec&sid1=105&oid=018&& aid =0003068505 (Sep. 5, 2014:) (w/English translation).

Office Action dated Mar. 4, 2021 in Chinese Application No. 202010837944.X (w/computer-generated English translation).

Search Report dated Nov. 6, 2020 issued in corresponding European Patent application No. 20190735.9 (citing documents AA-AD therein).

Office Action dated Jan. 4, 2021 in Korean Application No. 10-2020-0104329 (w/English translation).

Office Action dated Feb. 23, 2021 in Singapore Application No. 10202007243P.

Office Action mailed in Taiwanese Application No. 109124980 (w/English translation).

Office Action dated May 27, 2021 in corresponding European Patent Application No. 20 190 735.9; 8 pages.

Notification of Reason for Refusal dated Sep. 14, 2021 in Korean Patent Application No. 10-2020-0104329 (with English machine translation), citing documents AW-AZ therein, 22 pages.

"Forex trading on the Internet, with "quick" . . . Foreign exchange bank, "Won Dollar Trading" to be sold next month," Retrieved from the Internet [URL: https://news.naver.com/main/read.naver?mode=LSD&mid=sec&sid1=101&oid=015&aid=0000237440], May 2000, 1 page.

"The golden age of direct overseas purchases . . . If you understand, "joy is doubled,"" Retrieved from the Internet [URL: https://news.naver.com/main/read.naver?mode=LSD&mid=sec&sid1=101&oid=022&aid=0002733113], Nov. 2014, 2 pages.

"Golden Tulip Jeju Nohyeong Hotel . . . Issued the first repurchase certificate of a brand hotel," Retrieved from the Internet [URL: https://news.naver.com/main/read.naver?mode=LSD&mid=sec&sid1=101&oid=009&aid=0003532042], Jul. 2015, 2 pages.

"Install the app for each bank? Entering the "one app" era," Retrieved from the Internet [URL: https://news.naver.com/main/read.naver?mode=LSD&mid=sec&sid1=10&oid=029&aid=0002443664], Jan. 2018, 2 pages.

Chinese Office Action dated Aug. 18, 2021 in Chinese Patent Application No. 202010837944.X (with unedited computer generated English translation), 14 pages.

Indian Office Action dated Nov. 18, 2021 in Indian Patent Application No. 202014036371, 5 pages.

Singaporean Office Action dated Nov. 24, 2021 in Singaporean Patent Application No. 10202007243P, 5 pages.

Office Action dated Dec. 10, 2021 in European Application No. 20 190 735.9.

* cited by examiner

User A

| Electronic money service | Charged amount |
|---|---|
| A-Pay | 1000 yen |
| B-Pay | 100 yuan |
| C-Pay | 200 dollars |

User A

| Electronic money service | Charged amount |
|---|---|
| A-Pay | 1000 yen, 100 yuan |
| B-Pay | 100 yuan, 100 dollars |
| C-Pay | 200 dollars |

FIG. 4

User A

| Electronic money service | Charged amount |
|---|---|
| A-Pay<br>B-Pay<br>C-Pay | 1000 yen, 200 yuan,<br>300 dollars |

FIG. 5

User A

| Item | Price | Purchase date |
|---|---|---|
| A | 1000 yen | 2019/9/20/13:10 |
| B | 500 yen | 2019/9/21/14:25 |
| | | |

ELECTRONIC MONEY MANAGEMENT SYSTEM AND ELECTRONIC MONEY MANAGEMENT METHOD

CROSS-REFERENCE TO RELATED APPLICATIONS

This application is based upon and claims the benefit of priority from prior Japanese Patent Application No. 2019-200275, filed Nov. 1, 2019, the entire contents of which are incorporated herein by reference.

FIELD

The present invention relates generally to an electronic money management system and electronic money management method.

BACKGROUND

Traditionally, when traveling abroad, a traveler converts the currency of his/her own country to a currency of a given destination at a money exchange based on an exchange rate at the time of exchange. After returning from the trip, the traveler re-converts the destination currency to the home country currency at the money exchange. At the point of every currency exchange, the traveler needs to pay some form of commission fee in order to exchange money.

CITATION LIST

Patent Literature

Patent Literature 1: Jpn. Pat. Appln. KOKAI Publication No. 2006-318229

SUMMARY

There has been a problem, however, with the above-described method in that the traditional form of money exchange is both time-consuming and cumbersome, requiring the traveler to visit the currency exchange both before and after the trip in question.

To solve the above issue and achieve a purpose of the embodiments, the electronic money management system includes: a fund charging controller configured to perform a control in a manner such that, if a transaction is made on a user's terminal through an electronic money service of a first country to charge a designated amount of funds in a currency of a second country, the currency of the second country differing from a currency of the first country, the designated amount of funds in the currency of the second country is charged based on an exchange rate at time of the transaction; and a deduction unit configured to, if an electronic money service of the second country is used on the terminal, deduct an amount used from the currency of the second country charged by the fund charging controller.

In addition, the electronic money management method implemented by the electronic money management system includes: performing a control in a manner such that, if a transaction is made on a user's terminal through an electronic money service of a first country to charge a designated amount of funds in a currency of a second country, the currency of the second country differing from a currency of the first country, the designated amount of funds in the currency of the second country is charged based on an exchange rate at time of the transaction; and deducting, if an electronic money service of the second country is used on the terminal, an amount used from the currency of the second country charged by performing the control.

The present embodiments offer the advantageous effects of reducing the time required and simplifying the cumbersome procedure for currency exchange.

BRIEF DESCRIPTION OF THE DRAWINGS

FIG. 4 is a diagram showing another form of exemplary data stored in the balance information storage unit.

FIG. 5 is a diagram showing still another form of exemplary data stored in the balance information storage unit.

DETAILED DESCRIPTION

Embodiments of an electronic money management system and an electronic money management method according to the present invention will be described in detail with reference to the drawings. The electronic money management system and electronic money management method are not limited by these embodiments.

First Embodiment

In the following description, the outline of an electronic money management system 100 and the configuration of the server 10 according to the first embodiment will be discussed in order, and finally the effects of the first embodiment will be discussed.

Configuration of Electronic Money Management System

Figure 1:
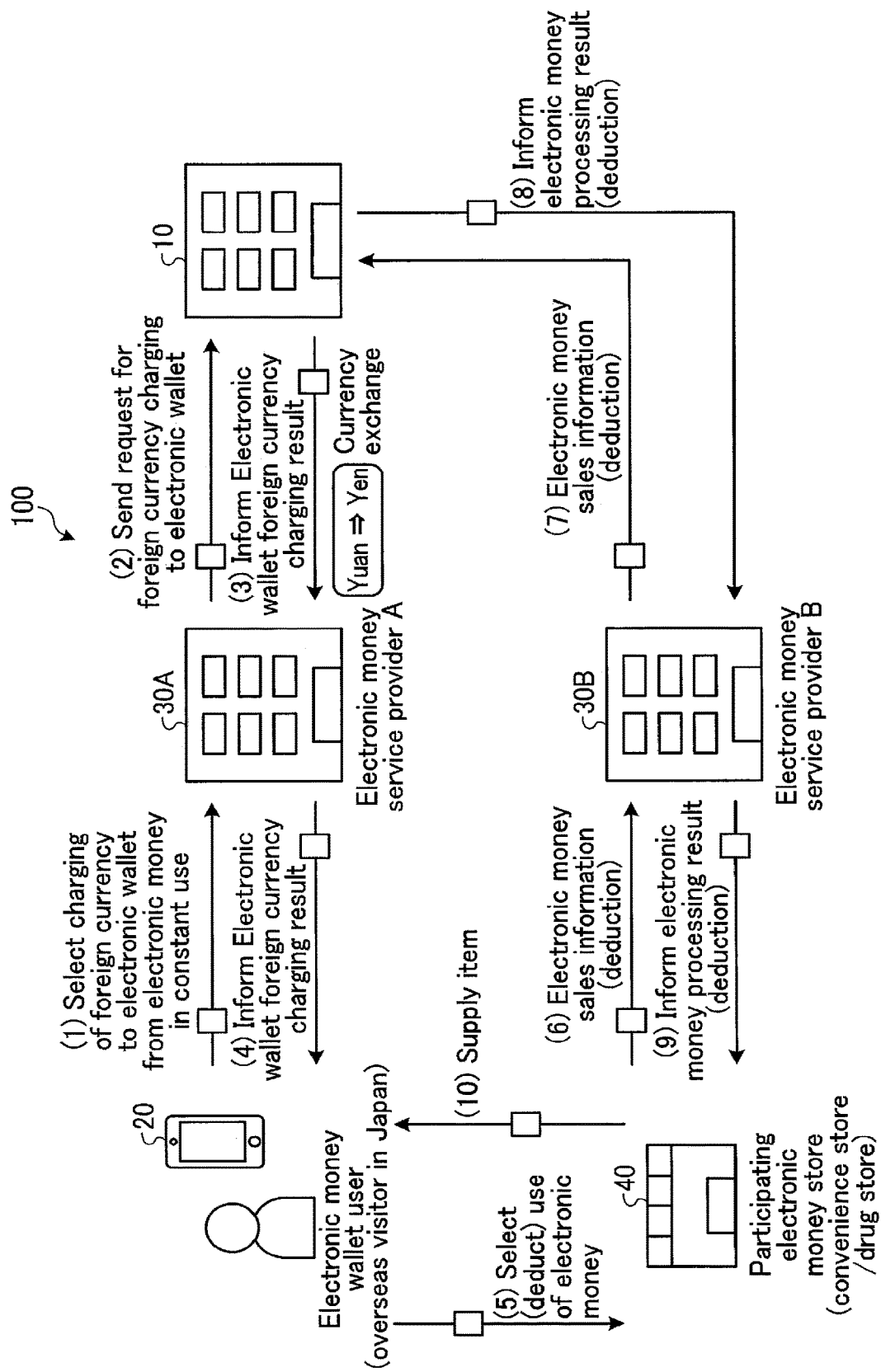
FIG. 1 is a schematic diagram of an electronic money management system according to a first embodiment.

FIG. 1 is a schematic diagram of an electronic money management system according to the first embodiment. The electronic money management system 100 according to the first embodiment includes a server 10, a terminal 20, service delivery apparatuses 30A and 30B of different electronic money service providers, and a store apparatus 40 of an electronic money participant store. The configuration of FIG. 1 is presented merely as an example, and therefore the detailed configuration and the number of apparatuses are not limited thereto. If the service delivery apparatuses 30A and 30B have no need to be particularly distinguished from each other, they may be referred to simply as "service delivery apparatuses 30" as appropriate.

The electronic money management system 100 provides a service which charges foreign currencies to an electronic wallet through an electronic money service of the user's own country, and renders a service in the electronic money of a different country usable through the use of a foreign currency in the electronic wallet.

The server 10 of the electronic money management system 100 performs control in a manner such that, if a transaction for charging a certain amount of funds in a currency of the second country that differs from the currency of the first country is conducted on a user's terminal 20, through the use of an electronic money service of the first country, this amount of funds in the currency of the second country is charged to the electronic money service of the first country at the exchange rate at the time of the transaction.

The server 10 may provide a multi-currency conversion service through an application programming interface (API) capable of purchasing (exchanging) foreign currencies with a predetermined application (app) implemented on the terminal 20.

IF the electronic money service of the second country is used on the terminal 20, the server 10 deducts the amount used from the funds in the currency of the second country. For instance, when goods are purchased through the electronic money service at a travel destination, the server 10 deducts the purchase amount and a fee from the previously charged electronic money in the currency of the travel destination (i.e., as the traveler sees it, a foreign currency).

In the following description with reference to FIG. 1, an example of a Chinese user traveling to Japan will be discussed. In this example, the user's own country is "China", which means the first country is "China" and the second country is "Japan". The foreign currency is "yen (Japanese yen)", and the currency of the user's own country is "yuan (Chinese yuan)".

The terminal 20 is a smart apparatus such as a smartphone or a tablet, which is a mobile terminal apparatus capable of communicating with a server via a wireless communication network. The terminal 20 may be an information processing apparatus such as a desktop personal computer (PC) or notebook PC. The terminal 20 has a function of specifying the current location through the use of a positioning system such as a global positioning system (GPS) and outputting the location information indicating the specified location.

The service delivery apparatuses 30A and 30B of the electronic money service providers are information processors for providing the electronic money services, and are realized, for example, by a server or a cloud system. In the following description, the service delivery apparatus 30A of the electronic money service provider A provides a Chinese electronic money service, and the service delivery apparatus 30B of the electronic money service provider B provides a Japanese electronic money service.

The store apparatus 40 of an electronic money participant store may be an information processing apparatus that delivers an electronic payment service, with which payment is settled simply by holding the terminal 20 or a card over a specifically designed reader (reader/writer). It is assumed that at least the electronic money service of the electronic money service provider B is usable on the store apparatus 40 of the electronic money participant store.

In the electronic money management system 100, funds can be exchanged into a foreign currency on the terminal 20 at any desired time and charged to an electronic wallet. For instance, in the electronic money management system 100, when a Chinese traveler visits Japan, a foreign currency (Japanese yen) can be charged to his/her electronic wallet through a Chinese electronic money service (e.g., Alipay (trademark)), which is in constant use. Furthermore, in the electronic money management system 100, with the foreign currency (Japanese yen) already charged in the electronic wallet, the purchase of goods or a train ride can be performed through the use of a Japanese electronic money service (e.g., Suica (trademark)).

The processing flow of charging electronic money (foreign currency) into an electronic wallet and using the charged electronic money in a foreign country will be described with reference to the example of FIG. 1. As illustrated in FIG. 1, the user manipulates the terminal 20 and selects the charging of a foreign currency to the electronic wallet from the electronic money in daily use (see (1) in FIG. 1). In other words, the user can purchase the foreign currency with the electronic money of his/her home currency at a certain exchange rate and hold the foreign currency in the electronic wallet. If the foreign currency charging is selected, the service delivery apparatus 30A sends, to the server 10, a request for foreign currency charging to the electronic wallet (see (2) in FIG. 1).

If the server 10 charges the foreign currency to the electronic wallet, the server 10 informs the service delivery apparatus 30A of the electronic money service provider A of the results of charging the foreign currency to the electronic wallet (see (3) in FIG. 1). Here, currency exchange is conducted between the server 10 side and the electronic money service provider side to exchange the currency between "yuan", which is the home currency for the user, and "yen", which is a foreign currency. Upon receipt of the notification, the service delivery apparatus 30A of the electronic money service provider A informs the terminal 20 of the result of charging the foreign currency to the electronic wallet (see (4) in FIG. 1).

Thereafter, when going on a trip to Japan and purchasing goods at a participating electronic money store such as a convenience store or a drug store, the user of the electronic wallet checks the price indicated on the item and selects the use of the electronic money (see (5) in FIG. 1). Then, the store apparatus 40 informs the service delivery apparatus 30B of the electronic money service provider B of the electronic money sales information (see (6) in FIG. 1). The service delivery apparatus 30B of the electronic money service provider B informs the server 10 of the electronic money sales information (see (7) in FIG. 1).

Upon receipt of the electronic money sales information, the server 10 performs a process of deducting the amount of money used in the foreign currency of the electronic wallet, and informs the service delivery apparatus 30B of the electronic money service provider B of the electronic money processing results (see (8) in FIG. 1). Then, the service delivery apparatus 30B of the electronic money service provider B informs the store apparatus 40 of the electronic money processing results (see (9) in FIG. 1). Thereafter, the electronic money participant store supplies the item to the user (see (10) in FIG. 1).

Configuration of Server Apparatus

Figures 2, 3:
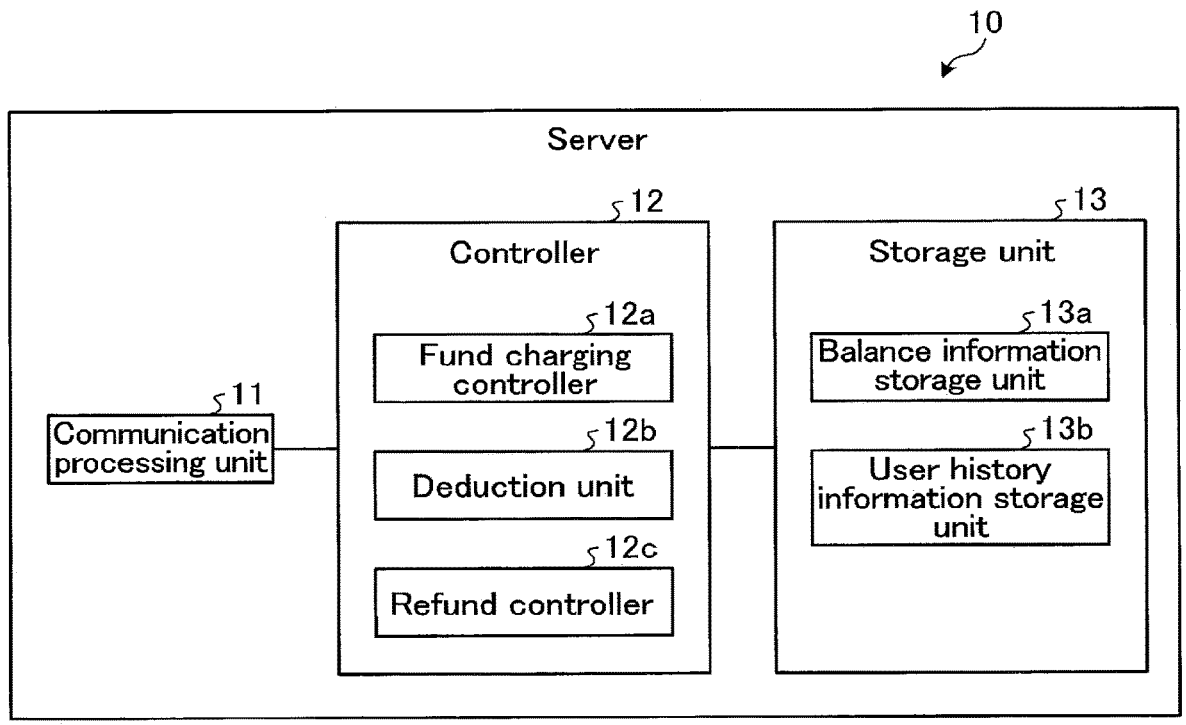
FIG. 2 is a block diagram showing an exemplary configuration of a server according to the first embodiment.
FIG. 3 is a diagram showing a form of exemplary data stored in a balance information storage unit.

Next, the configuration of the server 10 will be described with reference to FIG. 2. FIG. 2 is a block diagram showing an exemplary configuration of a server according to the first embodiment. As illustrated in FIG. 2, the server 10 includes a communication processing unit 11, a controller 12, and a storage unit 13. The processing performed by the components of the server 10 will be described below. The functions of the server 10 may be divided and assigned to multiple apparatuses.

The communication processing unit 11 controls communications relating to various types of information. For example, the communication processing unit 11 controls the communications with the service delivery apparatuses 30 operated by the electronic money service providers.

The storage unit 13 stores data and programs necessary for various processing performed by the controller 12. In particular, the storage unit 13 includes a balance information storage unit 13a and a user history information storage unit 13b, as components relevant to the present embodiment. The storage unit 13 may be a semiconductor memory element such as a random access memory (RAM) and a flash memory, or a storage device such as a hard disk and an optical disk.

The balance information storage unit 13a stores the amount of money charged to the electronic wallet for every user. The balance information storage unit 13a may store charged amounts available for different electronic money services. An example will be explained with reference to FIG. 3. The balance information storage unit 13a associates and stores the names of electronic money services and charged amounts for the user A, as illustrated in FIG. 3. In the illustrated example, the balance information storage unit 13a associates and stores the name of the electronic money service "A-Pay" and the charged amount "1000 yen". This denotes that the charged amount "1000 yen" is usable on A-Pay.

If multiple currencies are usable with an electronic money service, the balance information storage unit 13a may store the amounts in multiple currencies as the charged amounts that can be used in each electronic money service. In the example of FIG. 4, the balance information storage unit 13a associates and stores the name of the electronic money service "A-Pay" and the charged amounts "1000 yen" and "100 yuan" for the user A. This denotes that the funds usable on A-Pay are "1000 yen" and "100 yuan".

The balance information storage unit 13a may store a charged amount commonly usable among different electronic money services. In the example of FIG. 5, the balance information storage unit 13a associates and stores the electronic money service names "A-Pay", "B-Pay" and "C-Pay" and the charged amounts "1000 yen", "200 yuan" and "300 dollars". This denotes that the amounts of funds that can be used commonly among A-Pay, B-Pay and C-Pay are "1000 yen", "200 yuan" and "300 dollars". FIGS. 3 to 5 are diagrams showing examples of data stored in the balance information storage unit.

Figures 6, 7:
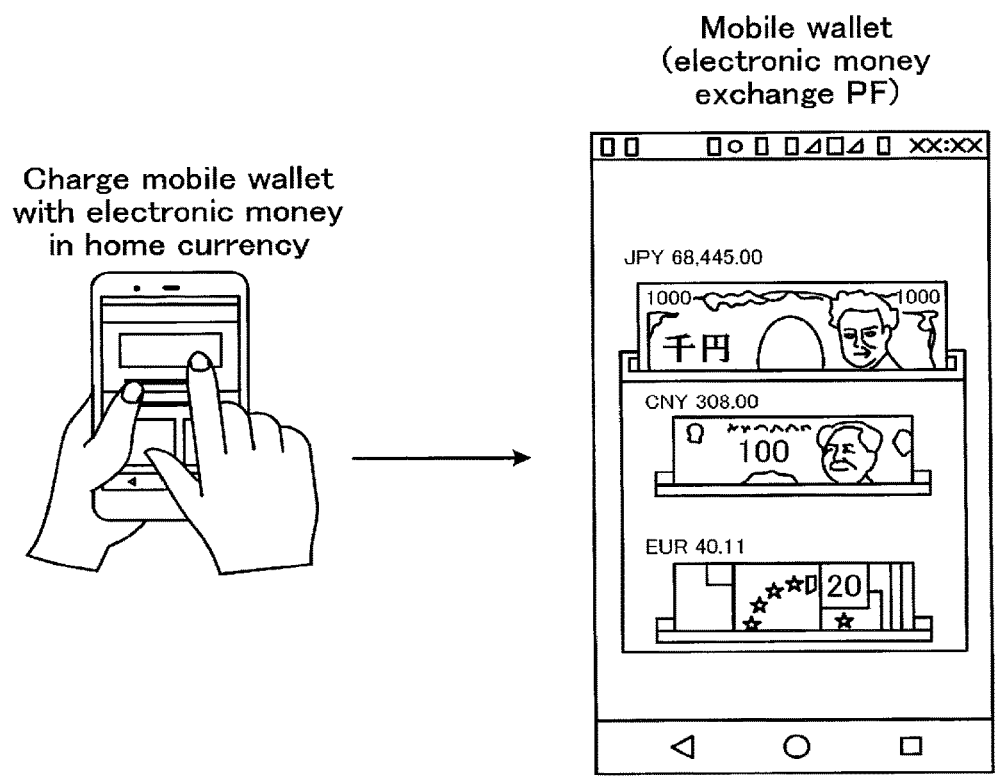
FIG. 6 is a diagram showing exemplary data stored in a purchase history information storage unit.
FIG. 7 is a diagram showing an exemplary screen that appears in the process of charging an electronic wallet.

The user history information storage unit 13b stores the history of electronic money used by the users. As illustrated in FIG. 6, the user history information storage unit 13b may associate and store an "item name" indicating the name of each item purchased, "price" indicating the price of the item purchased, and a "purchase time" indicating the date and time of the item purchase. FIG. 6 is a diagram showing the exemplary data stored in the purchase history information storage unit.

The controller 12 includes an internal memory for storing programs defining various processing procedures and data required for these programs, thereby implementing various processing. In particular, the controller 12 includes a fund charging controller 12a, a deduction unit 12b, and a refund controller 12c as components closely related to the present embodiments. Here, the controller 12 is an electronic circuit such as a central processing unit (CPU) and a micro processing unit (MPU), or an integrated circuit such as an application specific integrated circuit (ASIC) and a field programmable gate array (FPGA).

The fund charging controller 12a performs control in a manner such that, when a charging transaction for a certain amount of money in the currency of the second country that differs from the currency of the first country is conducted on the terminal 20 of the user, through the use of the electronic money service of the first country, this amount of money in the currency of the second country is charged at the exchange rate at the time of the transaction. For example, when a charging transaction of 1000 yen to the electronic wallet is conducted on the terminal 20 of the user through the screen of a Chinese electronic money service, the fund charging controller 12a performs a yuan-to-yen conversion at the exchange rate at the time of the transaction, and charges the funds equivalent to 1000 yen to the electronic wallet. Here, a commission fee may be incurred between the server 10 and an electronic money service provider. The fee may vary among electronic money service providers. When the user intends to charge, for example, 1000 yen to the electronic wallet, the fund charging controller 12a may calculate the amount in home currency "yuan" equivalent to 1000 yen at the exchange rate at the time of the transaction, and then further calculate the total amount of the fee added to the calculated amount in the home currency "yuan". The calculated total amount is the actual payment amount for the user. The payment method for the user's charging of funds is not limited to the use of an application on the terminal 20; charging may also be made in cash or on a credit card. The payment method for charging may vary among electronic money service providers.

The fund charging controller 12a may be configured to charge funds in multiple currencies. For example, the fund charging controller 12a may receive a currency type designated on the terminal 20 when a transaction for charging is conducted, and perform a control to charge funds in the received currency type. Next will be described, with reference to FIG. 7, a charging transaction of funds in multiple kinds of currency to the electronic wallet through the electronic money service regularly used by the user. FIG. 7 is a diagram showing an exemplary screen for charging funds to the electronic wallet. As illustrated in FIG. 7, the user can select a foreign currency to be charged to the electronic wallet and charge funds in the selected foreign currency through usage of the electronic money service of the user's own country. In the example of FIG. 7, Japanese yen, Chinese yuan, and Euros are displayed as usable electronic money on the screen of the electronic wallet in the terminal 20, with the respective usable amounts of funds indicated.

If the electronic money service of the second country is used on the terminal 20, the deduction unit 12b deducts the amount spent from the currency of the second country, which has been charged by the fund charging controller 12a. For example, at the time of purchasing goods at an electronic money participant store such as a convenience store or a drug store, the deduction unit 12b deducts the purchased amount from the charged amount stored in the balance information storage unit 13a. Here, the electronic money usage fee may also be deducted together with the purchased amount. If this is the case, the deduction unit 12b calculates the payment amount by adding up the fee for the server 10 and also the fee for an electronic money service provider, which may vary among electronic money service providers, and deducts the payment amount from the charged amount.

The deduction unit 12b may calculate a discounted payment amount if the user satisfies predetermined conditions. For example, if the user has an electronic coupon issued by a merchant or the like, the deduction unit 12b may calculate a discounted payment amount in accordance with the description of the coupon.

Moreover, the deduction unit 12b may offer a discount on the payment amount in accordance with the purchase history of the user. In particular, by referring to the user history information storage unit 13b, the deduction unit 12b may offer a discount and calculate the payment amount for the purchase made during a predetermined length of time, if the purchase history includes a purchase of a specific high-value item or a purchase of a predetermined amount or more.

Furthermore, the deduction unit 12b may offer a discount on the payment amount based on the status of the membership that varies in accordance with the number of times of use, the total purchase amount, and the like. Here, the status of the membership may be raised in stages, for example, if the number of times the electronic money management system 100 is used exceeds a predetermined threshold value or if the total purchase amount exceeds a predetermined amount. The deduction unit 12b may calculate the payment amount by offering a discount in accordance with the status of the membership.

Further, the deduction unit 12b may offer a discount on the payment amount based on an alliance stamp rally. A stamp rally may be held commonly among multiple merchants. The deduction unit 12b may calculate a discounted payment amount in accordance with the stamps collected at the stamp rally.

If funds in multiple currencies are charged to the electronic wallet, the correct currency for use may be automatically selected based on the location information. For example, the deduction unit 12b may acquire, when using an electronic money service, the location information of the terminal 20, select a currency targeted for the deduction based on the location information, and make a deduction from the selected currency. For example, at the time of use of an electronic money service, if it is determined based on the location information that the user is at a convenience store that is a participating electronic money store in Japan, the deduction unit 12b selects Japanese yen and deducts the purchase amount from the charged funds in the selected Japanese yen. The settings may be configured such that if multiple electronic money services are usable at an electronic money participant store, the electronic money to be prioritized for use can be selected in advance.

The refund controller 12c performs control in such a manner that when a transaction for refunding the currency of the second country charged by the fund charging controller 12a into the electronic money service of the first country is performed on the terminal 20, the funds of the first country are refunded to the electronic money service of the first country at the same exchange rate as that applied at the time of charging. For example, when a transaction for refunding the foreign currency charged by the fund charging controller 12a to the regularly used electronic money service is performed on the terminal 20, the refund controller 12c performs control in a manner such that a refund is made to the regularly used electronic money service in the home currency, based on the same exchange rate as that at the time of charging.

In light of the above, when going on a trip, the user can charge a foreign currency to the electronic wallet through the electronic money service that the user regularly uses, and when returning from the trip, the user can have the funds refunded, in the home currency, to the electronic money service that the user regularly uses at the same exchange rate as that applied at the time of charging. The rate guaranteed period, during which a refund can be made at the same rate, may be set in advance in the server 10. For example, the server 10 may make a refund (money exchange) at the same rate as that of the time of charging if the refund is made within two weeks after charging the foreign currency, and make a refund at the exchange rate of the time of refunding after two weeks have elapsed. The length of the rate guaranteed period may be uniformly set for all users, or may differ among the users in accordance with the details of the contract with the user. If this is the case, the server 10 is configured to store information on the rate guaranteed period (the length of the rate guaranteed period, the start date of the rate guaranteed period, etc.) for individual users.

Figure 8:
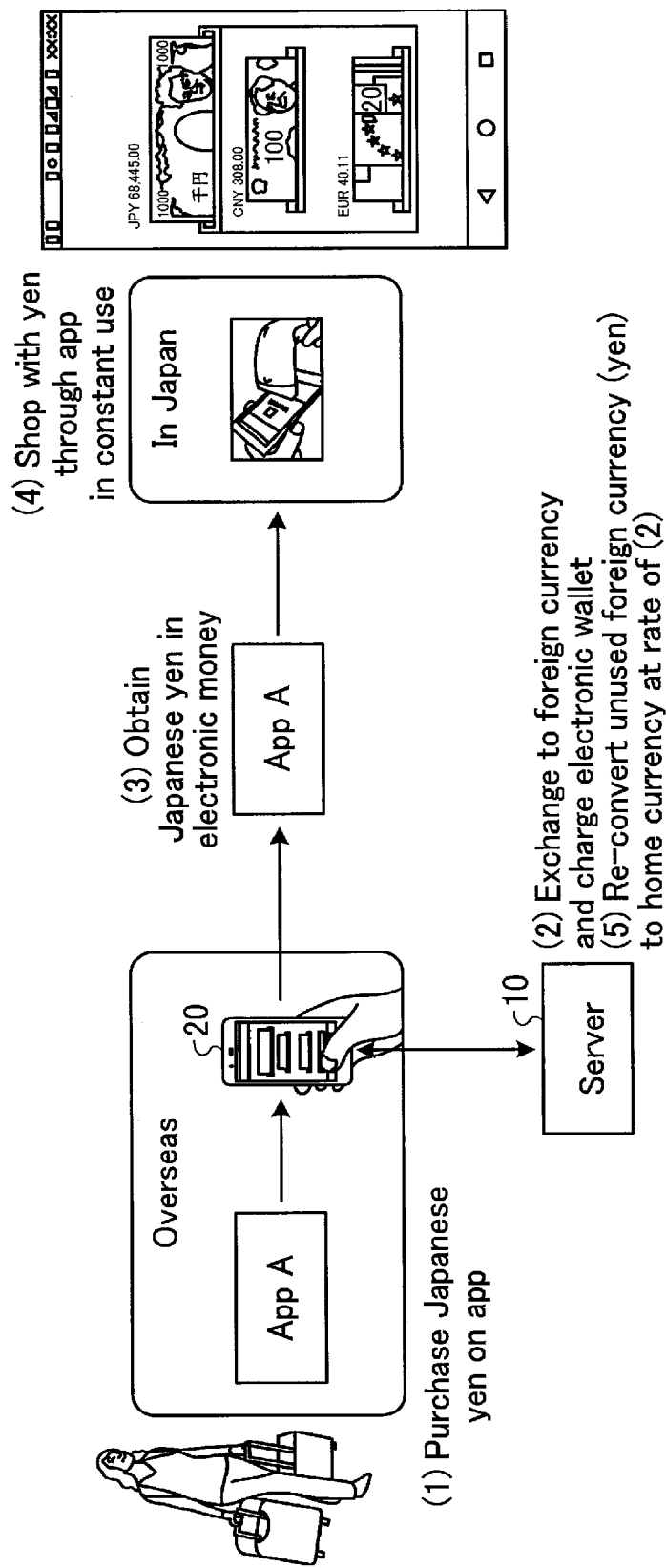
FIG. 8 is a diagram for explaining a flow of electronic money charging and refunding at the time of travel.

The flow of charging and refunding of electronic money at the time of traveling will be described. FIG. 8 is a diagram for explaining the flow of electronic money charging and refunding at the time of traveling. As shown in FIG. 8, the terminal 20 of a user who is traveling to Japan receives from the user a transaction for purchasing Japanese yen on the application A of the electronic money service that the user regularly uses (see (1) in FIG. 8).

Upon receipt of a request for the foreign currency charging, the server 10 converts the user's home currency into the foreign currency and charges the foreign currency to the electronic wallet (see (2) in FIG. 8). The user thereby obtains Japanese yen, which is the currency of the travel destination, in electronic money (see (3) in FIG. 8). Thereafter, at the time of shopping at the travel destination, the user may make a purchase in Japanese yen through the screen of the application A of the electronic money service that the user regularly uses (see (4) in FIG. 8). That is, the server 10 acquires sales information when a purchase is made, and deducts the amount of the purchase from the charged amount in Japanese yen in the electronic wallet.

Thereafter, when the user returns home and performs a transaction for refunding the foreign currency (Japanese yen) remaining in the terminal 20 to the home currency, the server 10 returns the foreign currency (Japanese yen) in the electronic wallet to the home currency at the rate of the purchase of Japanese yen (see (5) in FIG. 8). Thus, when going on a trip, the user can charge a foreign currency to the electronic wallet through the electronic money service that the user regularly uses. In addition, after returning from the trip, the user can refund the funds in the home currency to the electronic money service that the user regularly uses, at the same exchange rate as that applied at the time of charging.

Figure 9:
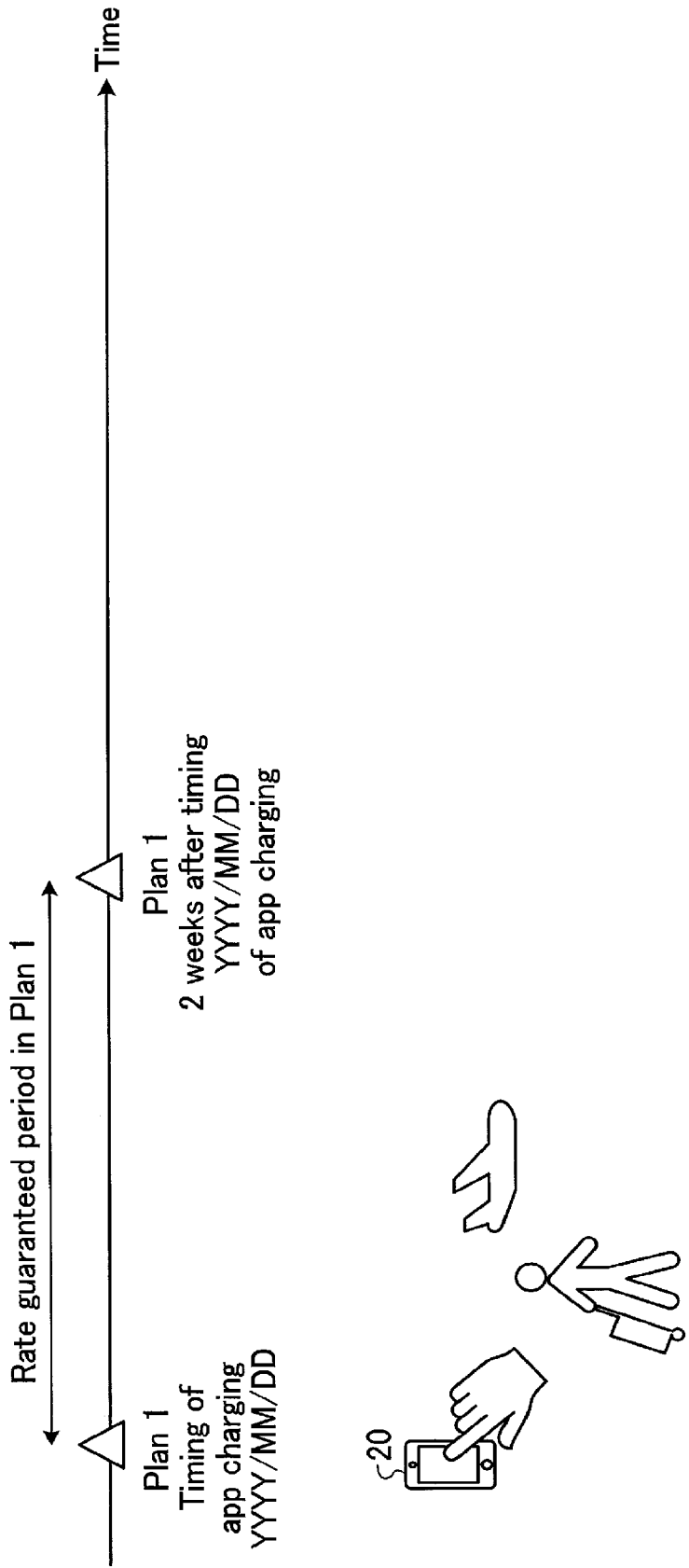
FIG. 9 is a diagram for explaining an exemplary rate guaranteed period.
Figure 10:
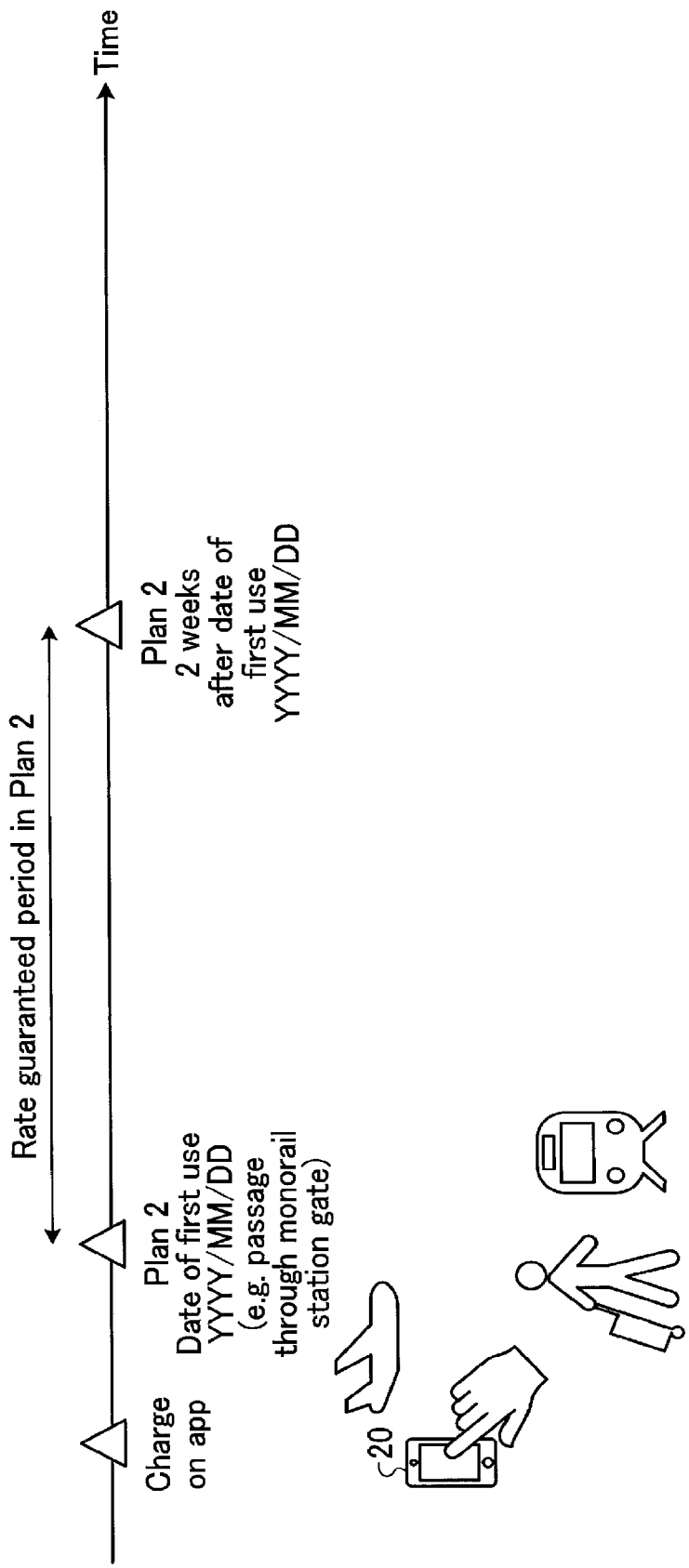
FIG. 10 is a diagram for explaining another exemplary rate guaranteed period.
Figure 11:
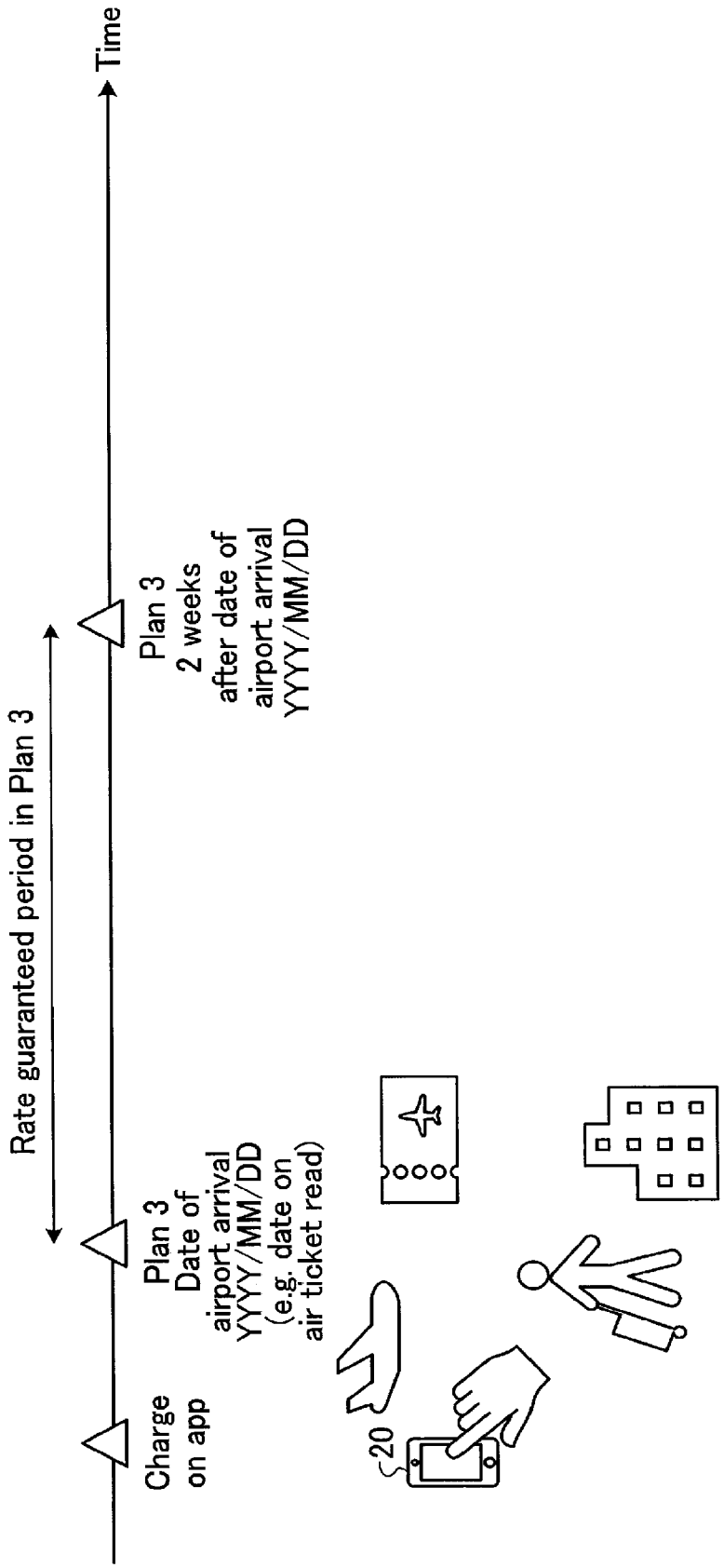
FIG. 11 is a diagram for explaining yet another exemplary rate guaranteed period.

The timing for commencing the above rate guaranteed period may begin on the day of charging the funds through the application, the day of the first use of the electronic money after charging, or the day of the user's arrival at a specific location such as an airport. Three plans will be described with reference to FIGS. 9 to 11: in "Plan 1", the timing for commencing the rate guaranteed period is the day of charging made on the application; in "Plan 2", the timing for commencing the rate guaranteed period is the day of the first use of the charged electronic money; and in "Plan 3", the timing for commencing the rate guaranteed period is the day of arrival at a predetermined location such as an airport. FIG. 9 is a diagram for explaining an exemplary rate guaranteed period. FIG. 10 is a diagram for explaining another exemplary rate guaranteed period. FIG. 11 is a diagram for explaining a further exemplary rate guaranteed period.

In the example of FIG. 9, the timing of charging of the terminal 20 through the application is the start day of the rate guaranteed period. For example, the rate guaranteed period of Plan 1 is two weeks from the start day, as illustrated in FIG. 9. Refunding is not limited to manual refunding, and may also be automatically performed. For instance, refunding (automatic charging-back) may be automatically made on the last day of the rate guaranteed period by accordingly setting the application of the terminal 20. Furthermore, automatic charging-back may be made when the exchange rate reaches the rate designated in advance after the rate guaranteed period has elapsed, by setting the application of the terminal 20 accordingly.

In the example of FIG. 10, the timing of the first use of the electronic money after being charged through the application of the terminal 20 is the start date of the rate guaranteed period. The rate guaranteed period of Plan 2 is two weeks from the day of the first use of the electronic money, for example, at the time of passing through a monorail station gate, as illustrated in FIG. 10. In Plan 2 also, automatic charging-back may be adopted.

In the example of FIG. 11, the timing of the arrival at the destination airport after charging is made on the application of the terminal 20 is the start date of the rate guaranteed period. For example, triggered by the detection of a Global Positioning System (GPS) or roaming, the application of the terminal 20 detects the timing of the arrival at the destination airport. The rate guaranteed period of Plan 3 is two weeks from the day of arrival at the destination airport, as illustrated in FIG. 11. In Plan 3 also, automatic charging-back may be adopted.

Figure 12:
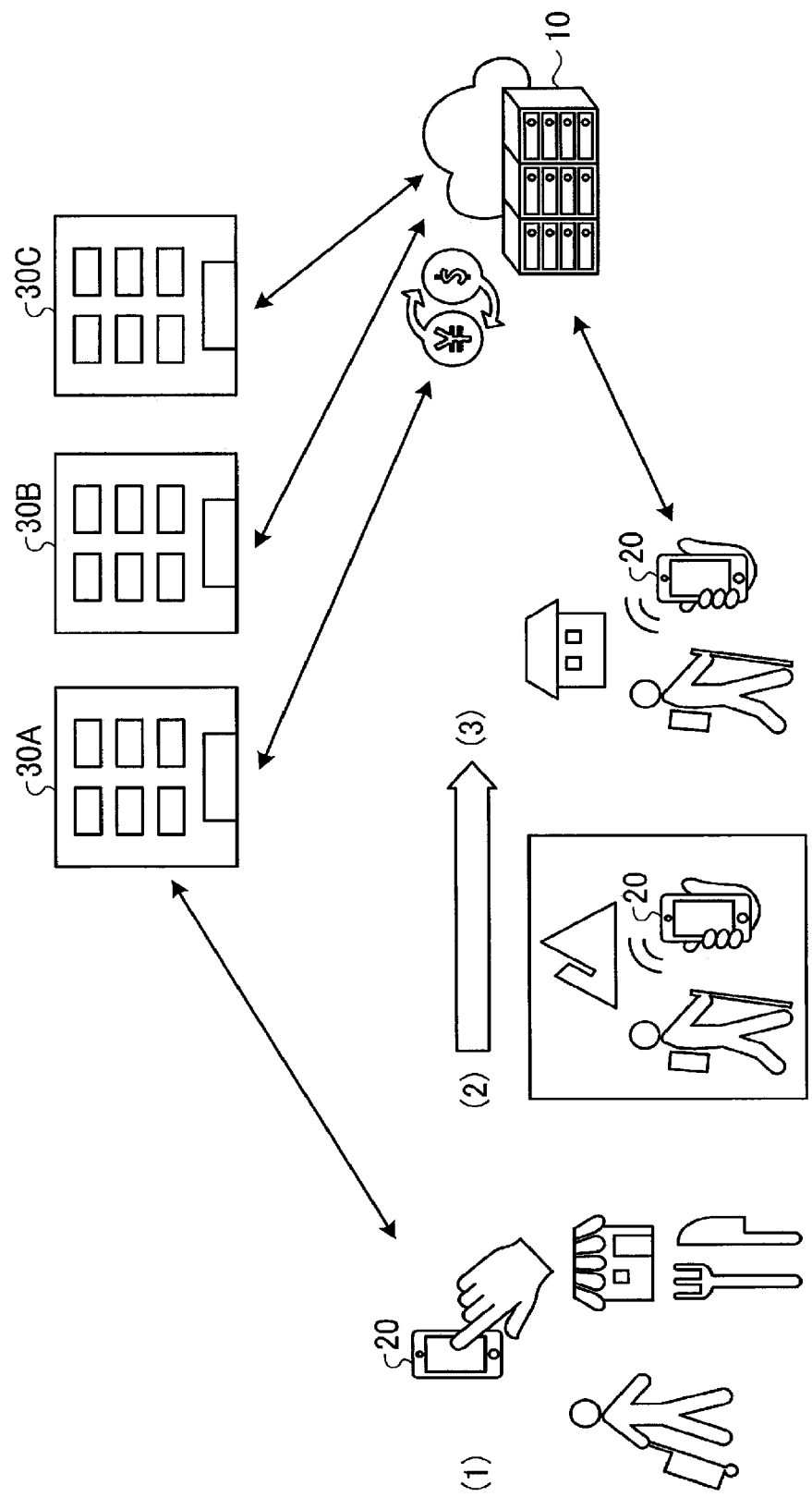
FIG. 12 is a diagram for explaining the type of use realized in a place where communication cannot be established, with rate information stored in a terminal.

The terminal 20 may store information relating to the charged amount and the rate, so as to render the electronic money usable even in a place where communication with the server 10 or the service delivery apparatuses 30 of the electronic money service provider cannot be established. FIG. 12 is a diagram for explaining the use realized in a place where communications cannot be established, with the rate information stored in a terminal. As illustrated in (1) of FIG. 12, the user can charge electronic money to his/her electronic wallet, or purchase goods with the electronic money, through the electronic money service that the user regularly uses. In the terminal 20, the information of the charged amount of electronic money, the applied exchange rate, the rate guaranteed period and the like may be stored in the storage unit (e.g., IC chip).

As illustrated in (2) of FIG. 12, the terminal 20 can use the electronic money based on the charged amount and the exchange rate stored in the storage unit even in a place where communications with the server 10 or the service delivery apparatuses 30 of the electronic money service provider cannot be established. If the user purchases an item using the electronic money of a foreign currency, the terminal 20 stores the date and time of use, the amount of electronic money used in the foreign currency, and the like, as user history, and calculates and stores the balance of the electronic money in the foreign currency.

Then, as illustrated in (3) of FIG. 12, in the area reachable by radio wave, the terminal 20 matches, with the information of the server 10, the information stored in the storage unit in the area unreachable by the radio wave and thereby updates the charged amount (balance) of the electronic money and the user history stored in the server 10. Moreover, the server 10 informs the service delivery apparatus 30 of the electronic money service provider about the updated charged amount (balance) of the electronic money and the user history.

As described above, in the electronic money management system 100, even in a place such as a resort destination outside the city or inside a cave where communications cannot be established, the electronic money can still be used regardless of a place of use by storing a charged amount (balance) and user history in the terminal 20. In addition, in the electronic money management system 100, such a stored record can be maintained even when the power of the terminal 20 is off. The terminal 20 can maintain data together with external apparatuses through a network when the power is restored.

Effect of First Embodiment

In the server 10 of the electronic money management system 100 according to the first embodiment, a control is performed if a transaction is made on a user's terminal 20 through an electronic money service of the first country to charge a designated amount of funds in a currency of the second country, which differs from a currency of the first country, in a manner such that the designated amount of funds in the currency of the second country is charged to the electronic money service of the first country based on an exchange rate at time of the transaction. This can reduce the time and cumbersome tasks associated with money exchange. That is, a user can purchase (exchange) a foreign currency through the application, without need to go to a money exchange.

Thus, in the electronic money management system 100, when, for example, a Chinese traveler visits Japan, the electronic money of a foreign currency (Japanese yen) can be charged anytime to his/her electronic wallet through the regularly used Chinese electronic money service.

If the electronic money service of the second country is used on the terminal 20, the server 10 deducts the amount of money used from the money charged in the currency of the second country. When an item is purchased through an electronic money service of the travel destination, the server 10 deducts the purchase amount and a fee from the electronic money in the currency of the travel destination (i.e., a foreign currency for the traveler) that has been previously charged.

Accordingly, in the electronic money management system 100, a Chinese traveler can charge a foreign currency (Japanese yen) to his/her electronic wallet, and thereby purchase goods or ride a train, using a Japanese electronic money service.

In addition, in the electronic money management system 100 according to the first embodiment, a control is performed if a transaction is made on the terminal 20 to refund the charged currency of the second country to the electronic money service of the first country in a manner such that the funds in the currency of the first country are refunded to the electronic money service of the first country based on the same exchange rate as the rate applied at the time of charging. As a result, when going on a trip, the user can charge a foreign currency to the electronic wallet through the electronic money service that the user regularly uses, and when returning from the trip, the user can have the funds refunded to the electronic money service that the user regularly uses in the home currency, and at the same exchange rate as that applied at the time of charging.

In addition, in the electronic money management system 100 according to the first embodiment, upon receipt of designation of a currency from the terminal 20, the control is performed in a manner such that the funds in the currency of the received designation are charged; and if an electronic money service is used, location information of the terminal 20 is acquired, a currency targeted for deduction is selected in accordance with the location information, and the deduction is made from the selected currency. As a result, in the electronic money management system 100 according to the first embodiment, the type of the electronic money currency for use can be automatically selected at the time of using the electronic money service, based on the location information of the terminal 20.

System Configuration

The components of each apparatus illustrated in the drawings are only to represent conceptual functions, and may not be always physically configured as illustrated in the drawings. That is, specific forms of the distribution and integration of the apparatuses are not limited to those illustrated in the drawings. All or some of the apparatuses may be configured to be functionally or physically distributed or integrated in units as desired in accordance with various loads, usage conditions, and the like. Furthermore, all or part of the processing functions performed in the apparatuses may be realized by the CPU and a program analyzed and implemented by the CPU, or may be realized as hardware by wired logic.

Among the processes described in the present embodiment, all or part of the processes described as being automatically performed may be manually performed, or all or part of the processes described as being manually performed may be automatically performed with a commonly known method. In addition, the processing procedures, the control procedures, the specific names, and the information including various types of data and various parameters shown in the specification and the drawings can be freely changed, unless otherwise specified.

Program

It is also possible to create a program by describing the processing executed by the apparatuses in the above embodiment in a computer-executable language. For example, a program may be created by describing the processing executed by the server 10 according to the embodiment in a computer-executable language. If this is the case, the same effects as those of the above-described embodiment can be achieved by the computer executing the program. Such a program may be stored in a computer-readable storage medium so that the same processing as that of the above-described embodiment can be realized by a computer reading and executing the program stored in the storage medium.

Figure 13:
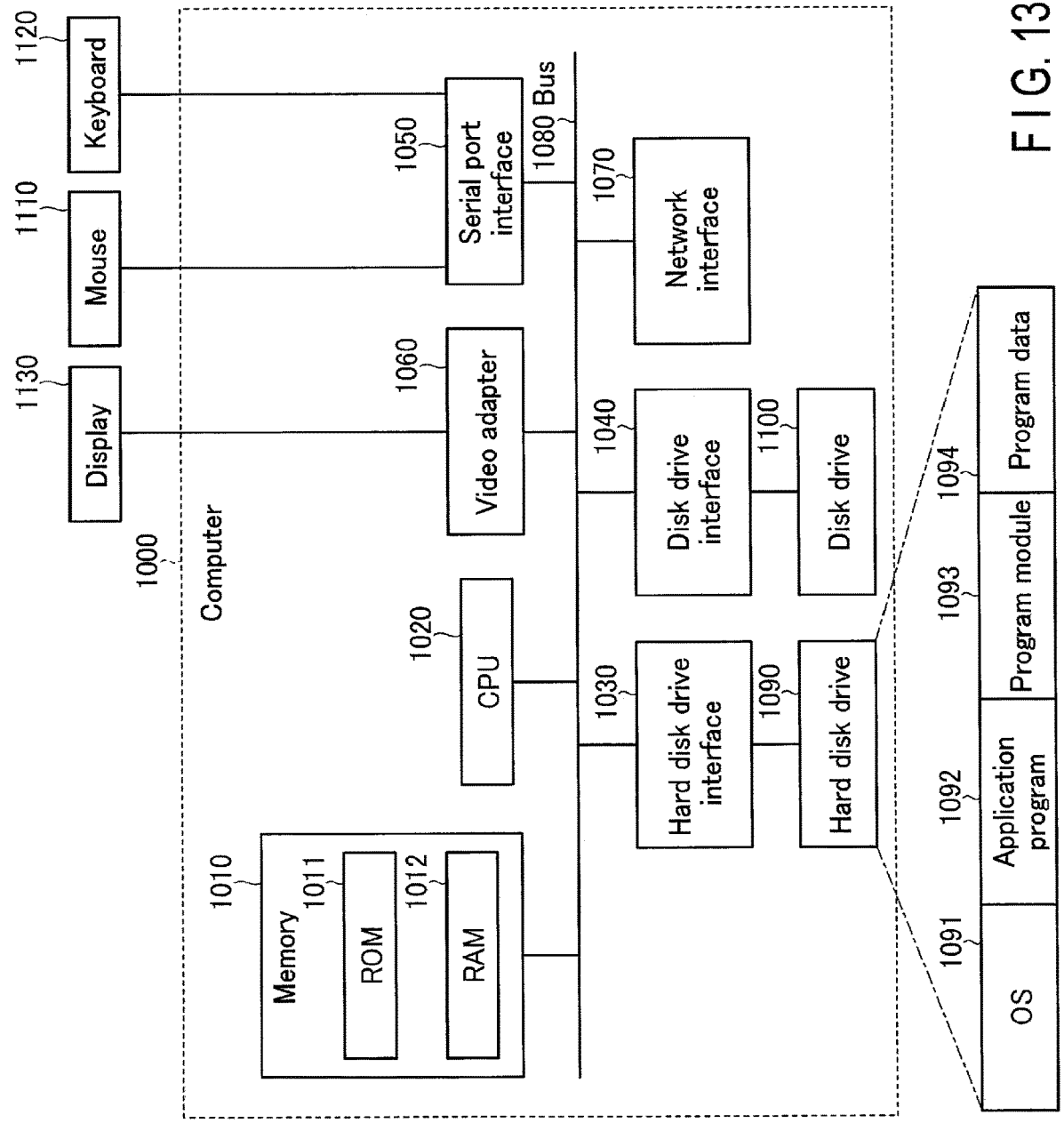
FIG. 13 is a diagram showing a computer configured to execute a program.

FIG. 13 is a diagram showing a computer that executes a program. As illustrated in FIG. 13, the computer 1000 may include a memory 1010, a CPU 1020, a hard disk drive interface 1030, a disk drive interface 1040, a serial port interface 1050, a video adapter 1060, and a network interface 1070. These components are coupled by a bus 1080.

As illustrated in FIG. 13, the memory 1010 includes a read only memory (ROM) 1011 and a RAM 1012. The ROM 1011 stores a boot program such as the basic input output system (BIOS). The hard disk drive interface 1030 is coupled to a hard disk drive 1090, as illustrated in FIG. 13. The disk drive interface 1040 is coupled to a disk drive 1100, as illustrated in FIG. 13. For example, a removable storage medium such as a magnetic disk or an optical disk is inserted into the disk drive 1100. The serial port interface 1050 may be coupled to a mouse 1110 and a keyboard 1120, as shown in FIG. 13. The video adapter 1060 may be coupled to a display 1130 as illustrated in FIG. 13.

As shown in FIG. 13, the hard disk drive 1090 may store an OS 1091, an application program 1092, a program module 1093, and program data 1094. That is, the above program may be stored in the hard disk drive 1090 as a program module that describes instructions to be executed by the computer 1000.

The various data explained in the above embodiment may be stored as program data in the memory 1010 or the hard disk drive 1090. Then, the CPU 1020 reads the program module 1093 and the program data 1094 stored in the memory 1010 and the hard disk drive 1090, as necessary, onto the RAM 1012, and thereby executes various processing procedures.

The program module 1093 and the program data 1094 relating to the program are not limited to those stored in the hard disk drive 1090, and may be stored in a removable storage medium and read out by the CPU 1020 by way of a disk drive or the like. Alternatively, the program module 1093 and the program data 1094 relating to the program may be stored in a different computer connected via a network (e.g., Local Area Network (LAN) and Wide Area Network (WAN)) and read out by the CPU 1020 by way of the network interface 1070.

The above-described embodiments and modifications thereof are covered by the technology disclosed in the present application, and are also included in the invention described in the claims and the scope of equivalents thereof.

10 Server
11 Communication processing unit
12 Controller
12a Fund charging controller
12b Deduction unit
12c Refund controller
13 Storage unit
13a Balance information storage unit
13b User history information storage unit
20 Terminal
30A, 30B Service delivery apparatuses
40 Store apparatus

The invention claimed is:

1. An electronic money management system, comprising:
a memory configured to store data including an amount of funds in a currency of a first country and a currency of a second country; and
a processor comprising:
a fund charging controller configured to perform a control in a manner such that, when a transaction is made on a user's terminal through an electronic money service of the first country to charge a designated amount of funds in the currency of the second country to an electronic wallet corresponding to the user's terminal, the currency of the second country differing from the currency of the first country, the designated amount of funds in the currency of the second country is charged to the electronic wallet based on an exchange rate at time of the transaction; and
a deduction unit configured to, when an electronic money service of the second country is used on the user's terminal, deduct an amount used from the currency of the second country charged by the fund charging controller,
wherein the processor further comprises:
a refund controller configured to perform a control in a manner such that, when a transaction is made on the user's terminal to refund, to the electronic money service of the first country, the currency of the second country charged by the fund charging controller, the funds in the currency of the first country are refunded to the electronic money service of the first country based on the same exchange rate as the exchange rate applied at a time of charging when the transaction that is made on the user's terminal to refund occurs during a rate guaranteed period that is triggered to start upon an automatic detection of the user's terminal at a particular physical location within the second country, wherein the rate guaranteed period is triggered to start upon an automatic detection of the user's terminal at an airport within the second country based on detection by a global positioning system (GPS) included in the user terminal.

2. The electronic money management system according to claim 1, wherein when a charging transaction is made, the fund charging controller receives designation of a currency from the user's terminal, and performs the control in a manner such that the funds in the currency of the received designation are charged, and when an electronic money service is used, the deduction unit is configured to acquire location information of the user's terminal, select a currency targeted for deduction in accordance with the location information, and make the deduction from the selected currency.

3. The electronic money management system according to claim 1, wherein the memory stores the amounts in multiple currencies as charged amounts that can be used in each electronic money service.

4. The electronic money management system according to claim 1, wherein the memory stores a charged amount commonly usable among different electronic money services.

5. The electronic money management system according to claim 1, wherein a correct currency for use is automatically selected based on location information of the user terminal.

6. An electronic money management method implemented by an electronic money management system comprising a memory configured to store data including amount of funds in a currency of a first country and a currency of a second country, the method comprising:

performing, by a processor, a control in a manner such that, when a transaction is made on a user's terminal through an electronic money service of the first country to charge a designated amount of funds in the currency of the second country to an electronic wallet corresponding to the user's terminal, the currency of the second country differing from the currency of the first country, the designated amount of funds in the currency of the second country is charged to the electronic wallet based on an exchange rate at time of the transaction; and deducting, by the processor, when an electronic money service of the second country is used on the user's terminal, an amount used from the currency of the second country charged by performing the control, wherein the method further comprises:

performing, by the processor, a control in a manner such that, when a transaction is made on the user's terminal to refund, to the electronic money service of the first country, the currency of the second country charged by the fund charging controller, the funds in the currency of the first country are refunded to the electronic money service of the first country based on the same exchange rate as the exchange rate applied at a time of charging when the transaction that is made on the user's terminal to refund occurs during a rate guaranteed period that is triggered to start upon an automatic detection of the user's terminal at a particular physical location within the second country, and the rate guaranteed period is triggered to start upon an automatic detection of the user's terminal at an airport within the second country based on detection by a global positioning system (GPS) included in the user terminal.

7. A non-transitory computer readable medium that stores a program, that when executed by an electronic money management system, comprising a memory configured to store data including amount of funds in a currency of a first country and a currency of a second country, causes the electronic money management system to perform a method comprising:

performing, by a processor, a control in a manner such that, when a transaction is made on a user's terminal through an electronic money service of the first country to charge a designated amount of funds in the currency of the second country to an electronic wallet corresponding to the user's terminal, the currency of the second country differing from the currency of the first country, the designated amount of funds in the currency of the second country is charged to the electronic wallet based on an exchange rate at time of the transaction; and deducting, by the processor, when an electronic money service of the second country is used on the user's terminal, an amount used from the currency of the second country charged by performing the control, wherein the method further comprises:

performing, by the processor, a control in a manner such that, when a transaction is made on the user's terminal to refund, to the electronic money service of the first country, the currency of the second country charged by the fund charging controller, the funds in the currency of the first country are refunded to the electronic money service of the first country based on the same exchange rate as the exchange rate applied at a time of charging when the transaction that is made on the user's terminal to refund occurs during a rate guaranteed period that is triggered to start upon an automatic detection of the user's terminal at a particular physical location within the second country, and the rate guaranteed period is triggered to start upon an automatic detection of the user's terminal at an airport within the second country based on detection by a global positioning system (GPS) included in the user terminal.

* * * * *